(12) United States Patent
Chang

(10) Patent No.: US 7,511,893 B2
(45) Date of Patent: Mar. 31, 2009

(54) ZOOM LENS SYSTEM

(75) Inventor: Yu-Min Chang, Shijr (TW)

(73) Assignee: Asia Optical Co., Inc., Taichung (TW)

( * ) Notice: Subject to any disclaimer, the term of this patent is extended or adjusted under 35 U.S.C. 154(b) by 109 days.

(21) Appl. No.: 11/530,130

(22) Filed: Sep. 8, 2006

(65) Prior Publication Data

US 2007/0070519 A1 Mar. 29, 2007

(30) Foreign Application Priority Data

Sep. 28, 2005 (TW) .............................. 94133749 A

(51) Int. Cl.
*G02B 15/14* (2006.01)
(52) U.S. Cl. ...................................... 359/689; 359/683
(58) Field of Classification Search .................. 359/683, 359/689
See application file for complete search history.

(56) References Cited

U.S. PATENT DOCUMENTS 5,331,462 A * 7/1994 Yano ........................... 359/689
5,585,970 A * 12/1996 Shibayama .................. 359/686

* cited by examiner

*Primary Examiner*—William C Choi

(57) ABSTRACT

A zoom lens system is disclosed which includes a first lens group with negative optical power, a second lens group with positive optical power, and a third lens group with positive optical power, arranged in that order from an object side to an image side. The zoom lens system performs zooming by changing distances between the lens groups. The first lens group includes at least two negative lenses, and one of the negative lenses is adjacent to the second lens group and satisfies the following criteria $$0.08 < \left|\frac{R1}{R2}\right| < 0.52,$$

where R1 is the curvature radius of the first surface facing toward the object side, and R2 is the curvature radius of the second surface facing toward the image side.

9 Claims, 16 Drawing Sheets

ZOOM LENS SYSTEM

BACKGROUND OF THE INVENTION

1. Field of the Invention

The present invention relates to a zoom lens system, and more particularly, to a light-weight zoom lens system used in cameras.

2. Description of the Related Art

Traditionally, a zoom lens system widely used in digital cameras includes a first lens group with negative optical power, a second lens group with positive optical power, and a third lens group with positive optical power, arranged in order from an object side to an image side.

In recent years, due to remarkable development in digital cameras, the trend of digital cameras is moving toward a small and thin size and light weight. In addition, for photo elements used in digital cameras, such as a charge-coupled Device (CCD), the trend is moving toward higher resolution. Accordingly, a zoom lens system, disclosed in JP Patent Application No. 2000-284177, utilizes a third lens group to rapidly focus and attain a clearer image and to modify its optical aberrations.

Nevertheless, the demand for an increasing of pixels as well as smaller size of each pixel for cameras makes modifying the spherical aberration more urgently necessary. Further, the zoom lens system disclosed in JP Patent No. 2000-284177 fails to modify spherical aberration to satisfy current standards.

SUMMARY OF INVENTION

It is, therefore, a primary objective of the claimed invention to provide a light-weight zoom lens system using at least two plastic lenses capable of reducing the weight of the zoom lens system, modifying various optical aberrations to attain better image quality, and solving the prior art problems.

According to the claimed invention, a zoom lens system arranging in order from an object side to an image side comprises a first lens group with a negative optical power, a second lens group with a positive optical power, and a third lens group with a positive optical power. The first lens group comprises at least two negative lenses, and the negative lens adjacent to the second lens group is made of plastic. The second lens group comprises, from the object side to the image side, a positive lens, a negative lens, and a positive lens; the positive lens adjacent to the third lens group is made of plastic.

According to the claimed invention, a first lens group arranging in order from an object side to an image side comprising a first negative lens, a first positive lens, and a second negative lens which is made of plastic; and preferably, the second negative lens is an aspherical plastic lens and is adjacent to the second lens group.

According to the claimed invention, the negative lens of the first lens group which is adjacent to the second lens group, and meets a criterion of $$0.08 < \left|\frac{R1}{R2}\right| < 0.52, \quad \text{Criteria (1)}$$

where R1 indicates a curvature radius of a first surface facing the object side; R2 indicates a curvature radius of a second surface, facing the image side. When an absolute value of |R1/R2| is larger than the upper threshold of criteria (1), the wide-angle range of the zoom lens system is reduced. Furthermore, when the absolute value of |R1/R2| is smaller than the lower threshold of criteria (1), it indicates that the curvature radius R1 of the first surface is too small and the first surface of the third negative lens is too concave, thereby worsening distortion aberration of the zoom lens system to deteriorate the image quality.

According to the claimed invention, the second lens group arranging in order from an object side to an image side comprising a second positive lens and a third negative lens adhered to the second positive lens, and a third positive lens. A shutter and a grating are disposed between the first lens group and the second lens group.

The zoom lens system further comprises a fourth positive lens (L7), which contains an aspherical surface facing the object side, and is made of plastic.

The zoom lens system further complies with a criterion, $$0.14 < \frac{fG1 \times fG3}{fL3 \times fL6} < 0.31, \quad \text{Criteria (2)}$$

where fG1 indicates a focus length of the first lens group, fG3 indicates a focus length of the third lens group, fL3 indicates a focus length of the second negative lens (L3), and fL6 indicates a focus length of the third positive lens (L6). When a value of fL3×fL6 is too small, therefore, making the value of $$\frac{fG1 \times fG3}{fL3 \times fL6}$$

larger than the upper threshold of criteria (2), the image quality is deteriorated due to system aberration. When the value of fG1×fG3 is too small, therefore, making the value of $$\frac{fG1 \times fG3}{fL3 \times fL6}$$

smaller than the lower threshold of criteria (2), the wide angle range of the zoom lens system is reduced as a result.

According to the claimed invention, the zoom lens system further complies with a criterion of, $$1.85 < \frac{fW \times LW}{fT \times Y} < 2.21, \quad \text{Criteria (3)}$$

where fW indicates a focus length of the zoom lens system when the zoom lens system operates in a wide-angle state, LW indicates a length of the zoom lens system when the zoom lens system operates in the wide-angle state, fT indicates a focus length of the zoom lens system when the zoom lens system operates in a telephoto state, and Y indicates a maximum height of an image formed at the image side. When a value of $$\frac{fW \times LW}{fT \times Y}$$

is larger than the upper threshold of criteria (3), the length of the zoom lens system at the wide angle state becomes too long, thereby failing to shorten the zoom lens system. When the value of $$\frac{fW \times LW}{fT \times Y}$$

is smaller than a lower threshold of criteria (3), an allowable thickness margin of error for each lens and interval margin of error between lenses become restricted; thereby increasing the precision and complexity of manufacturing the zoom lens system.

An advantage of the claimed invention is that all the first, second, and third lens groups are made of plastic, in accordance with the present invention, thereby leading to the advantages of light-weight and low cost.

Another advantage of the claimed invention is the use of two plastic lenses which are capable of reducing the weight of the zoom lens system. Preferably, the first positive lens (L2), the second negative lens (L3), the third positive lens (L6), and the fourth positive lens (L7) are made of plastic.

The disclosed inventions will be described with reference to the accompanying drawings, which show important example embodiments of the invention and are incorporated in the specification hereof by related references.

DETAILED DESCRIPTION OF THE PREFERRED EMBODIMENT

The preferred embodiment zoom lens system can be used in a camera for zooming an image of a target object on an image sensor, such as a Charge Coupled Device (CCD). The zoom lens system arranged in order from an object side to an image side comprises a first lens group with a negative optical power, a second lens group with a positive optical power, and a third lens group with a positive optical power. The first lens group comprises at least two negative lenses where one is adjacent to the second lens group. The zoom lens system performs zooming action by changing distances between the lens groups.

Figure 1:
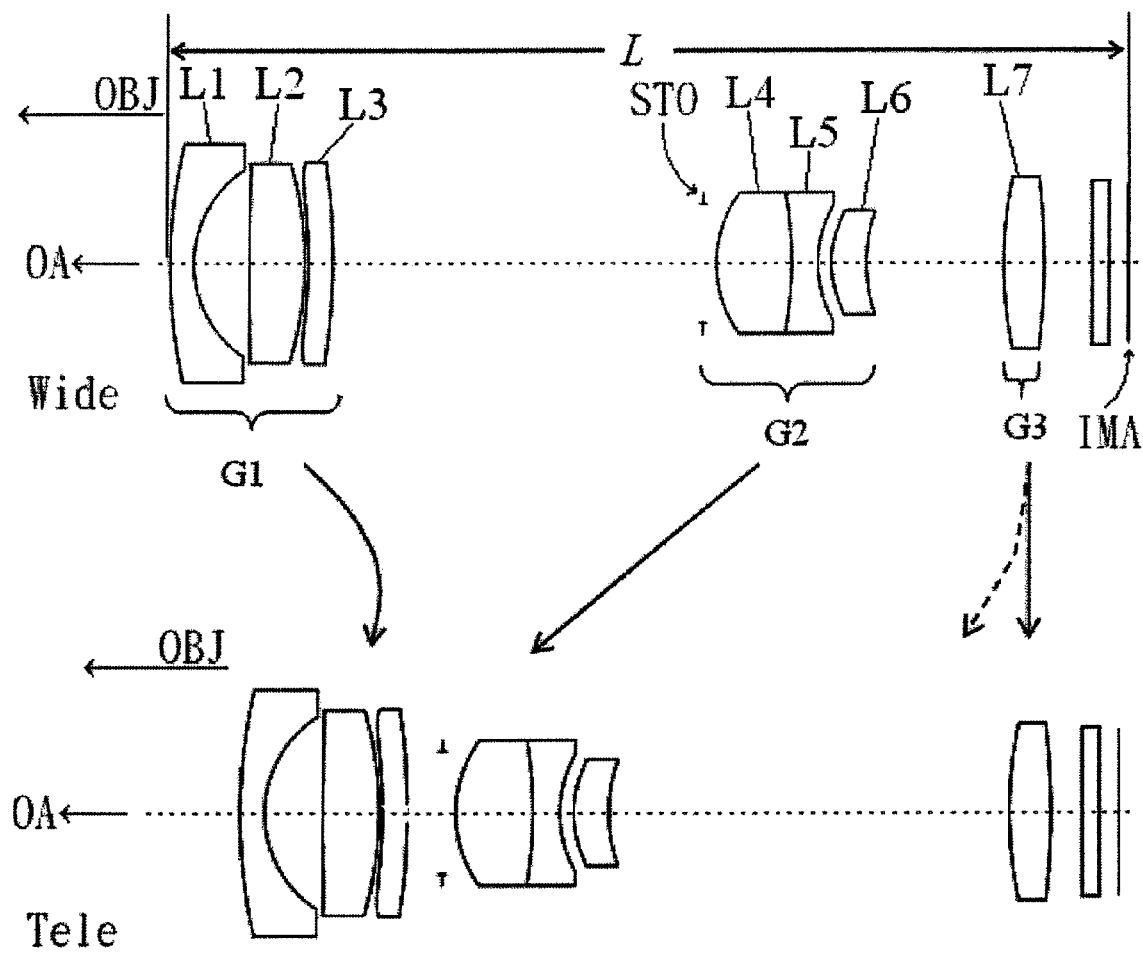
FIG. 1 illustrates the relative positions of the first, second, and third lens groups of the zoom lens system in a wide-angle state and in a telephoto state.

Referring to FIG. 1, the zoom lens system of the preferred embodiment arranged in order from an object side (OBJ) toward an image side (IMA) comprises a first lens group G1 with a negative optical power, a second lens group G2 with a positive optical power, and a third lens group G3 with a positive optical power. The focus length of the zoom lens system is assigned to f=1.06 mm–3.00 mm, and Fno.=2.66–4.65. FIG. 1 shows the relative positions of the respective lens groups when zooming action is performed from a wide-angle state (Wide) to a telephoto state (Tele), where the arrow OA is denoted by an optical axis.

The first lens group G1 arranged in order from the object side OBJ to the image side IMA further comprises a negative lens L1 with its concave surface facing the object side OBJ, a positive lens L2, and a negative lens L3 with its concave surface facing the object side OBJ. Both the positive lens L2 and the negative lens L3 are made of plastic. The first lens group G1 has a first focus length fG1=−2.60 mm; and the negative lens L3 is an aspherical negative lens, and favorably, the negative lens L3 is also made of plastic.

The second lens group G2 arranged in order from the object side OBJ to the image side IMA further comprises a positive lens L4, a negative lens L5 adhered to the positive lens L4, and a positive lens L6. The second lens group G2 has a second focus length of fG2=2.06 mm, and the positive lens L6 is an aspherical positive lens and is made of plastic.

The third lens group G3 comprises a positive lens L7 with an aspherical surface R71 facing the object side OBJ for modifying curvature aberration. The third lens group G3 has a third focus length fG3=3.90 mm, and the positive lens L7 is made of plastic.

In the preferred embodiment, parameters associated with the first, second, and third lens groups of the zoom lens system are listed in the following table, Table.1.

TABLE 1

System focus length f = 1.06~3.00 mm; Fno. = 2.66~4.65

| Surface serial | Curvature (mm) | Thickness (mm) | Refractive (Nd) | Abbe number (Vd) |
|---|---|---|---|---|
| R11 | 4.2648100 | 0.1796690 | 1.772499 | 49.60 |
| R12 | 0.8832286 | 0.3892301 | 1.000000 | |
| R21 | 4.6163017 | 0.4083391 | 1.585470 | 29.91 |
| R22 | −2.9756061 | 0.0199137 | 1.000000 | |
| R31 | −2.3126692 | 0.1796692 | 1.491756 | 57.44 |
| R32 | −4.5000200 | D1 | 1.000000 | |
| STO. | ∞ | 0.0980000 | 1.000000 | |
| R41 | 0.8952912 | 0.5635080 | 1.719995 | 50.40 |
| R51 | −5.0000000 | 0.1960028 | 1.784723 | 26.00 |
| R52 | 1.0315452 | 0.1068768 | 1.000000 | |
| R61 | 0.8266974 | 0.2774717 | 1.491756 | 57.44 |
| R62 | 1.3230124 | D2 | 1.000000 | |
| R71 | 12.9320322 | 0.3021709 | 1.491756 | 57.44 |
| R72 | −2.2321878 | D3 | 1.000000 | |
| R81 | ∞ | 0.13 | 1.516330 | 64.10 |
| R82 | ∞ | 0.13 | 1.000000 | |
| IMA. | | | | |

Further, in this embodiment, the surface serials R31 and R32 of the negative lens L3, the surface serials R61 and R62 of the positive lens L6, and the aspherical surface serial R71 of the positive lens L7, are listed in the following table, Table.2.

TABLE 2

| Serial | K | E4 | E6 | E8 | E10 |
|---|---|---|---|---|---|
| R31 | 0.00000 | 8.57065E−02 | 1.94080E−01 | −7.11124E−01 | 1.03541E−00 |
| R32 | 0.00000 | −3.46896E−02 | 6.01380E−02 | −5.61950E−01 | 7.06846E−01 |
| R61 | −2.69616 | 1.56876E−01 | −7.24868E−01 | −7.27635E+00 | −1.51845E+01 |
| R62 | 0.00000 | 4.11909E−01 | 2.92265E−01 | −9.45364E+00 | −2.50490E+00 |
| R71 | 0.00000 | 9.61713E−02 | −1.52447E−01 | −2.67194E−01 | 7.21779E−01 |

In this embodiment, relative distance between each set of lens groups on the optical axis is changed when zooming between the wide angel state (Wide) and the telephoto state (Tele). The relationship among a first distance D1 from the first lens G1 to the second lens group G2, a second distance D2 from the second lens group G2 to the third lens group G3, and the third distance D3 from the third lens group G3 to the image side IMA is illustrated in Table.3:

TABLE 3

| | First distance D1 | Second distance D2 | Third distance D3 |
|---|---|---|---|
| Wide angle state (fW = 1.06) | 2.8035092 | 0.8392842 | 0.5463907 |
| Intermediate range (f = 1.98) | 0.9328317 | 1.8410777 | 0.3882575 |
| Telephoto state (fT = 3.00) | 0.1671032 | 2.8146613 | 0.2703975 |

Based on Table.1, a relationship between the curvature radius R1 of the first surface R31 of the negative lens L3, and the curvature radius R2 of the second surface R32 of the negative lens L3 is calculated as |R1/R2|=0.51, meeting the criteria:

$$0.08 < \left|\frac{R1}{R2}\right| < 0.52. \quad \text{Criteria (1)}$$

Based on Table.1, the focus length of the negative lens L3 is given as fL3=−9.94 mm, and the focus length of the positive lens L6 is given as fL6=3.78 mm, meeting the criteria:

$$0.14 < \frac{fG1 \times fG3}{fL3 \times fL6} < 0.31, \quad \text{Criteria (2)}$$

$$\text{due to } \frac{fG1 \times fG3}{fL3 \times fL6} = 0.27.$$

Based on Table.3, the entire length of the zoom system at the wide angle end is set to LW=7.21 mm, and the maximum diagonal image height is set to Y=1.23 mm, meeting the criteria:

$$1.85 < \frac{fW \times LW}{fT \times Y} < 2.21, \quad \text{Criteria (3)}$$

$$\text{due to } \frac{fW \times LW}{fT \times Y} = 2.07.$$

Figure 2A:
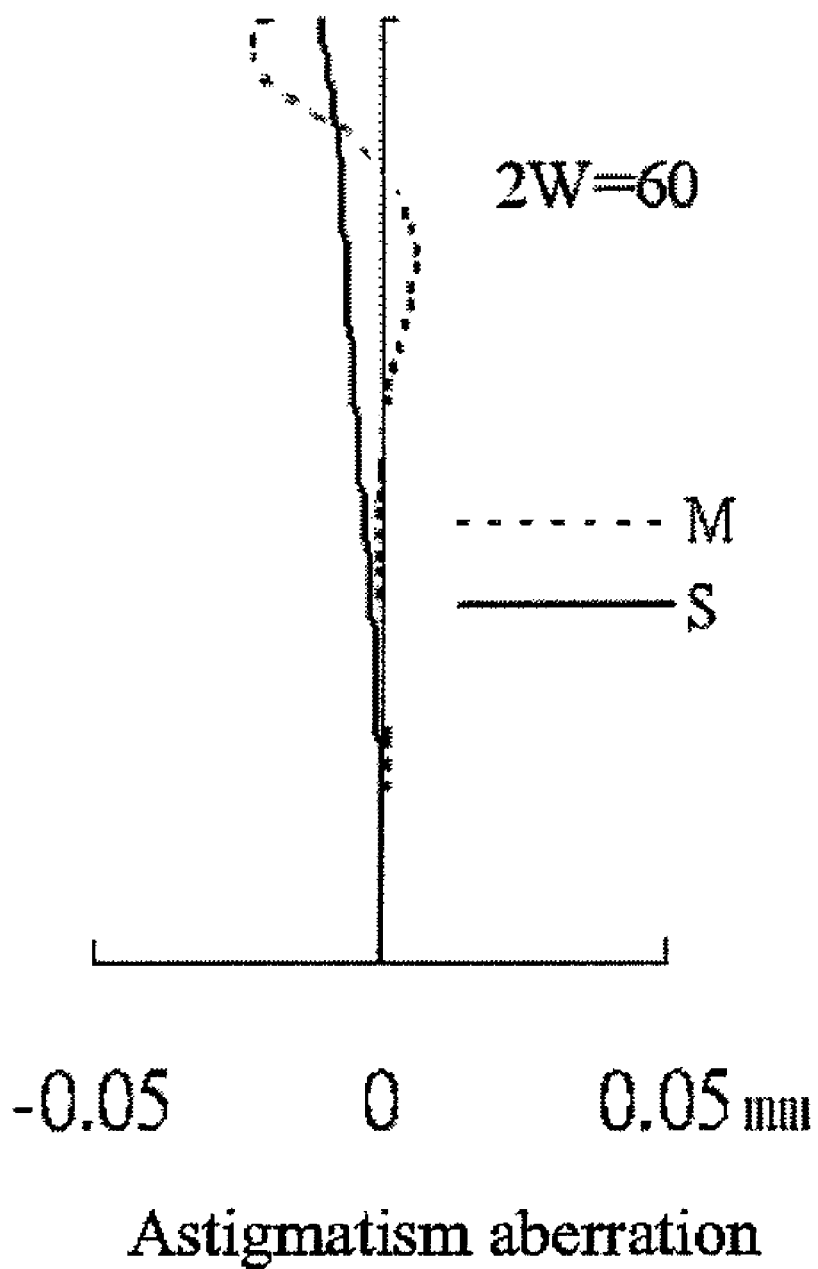
FIGS. 2A-2C are graphical representations of various astigmatism aberrations of the zoom lens system corresponding to respective incident angles of 60, 34, and 23 degrees according to the present invention.
Figure 2B:
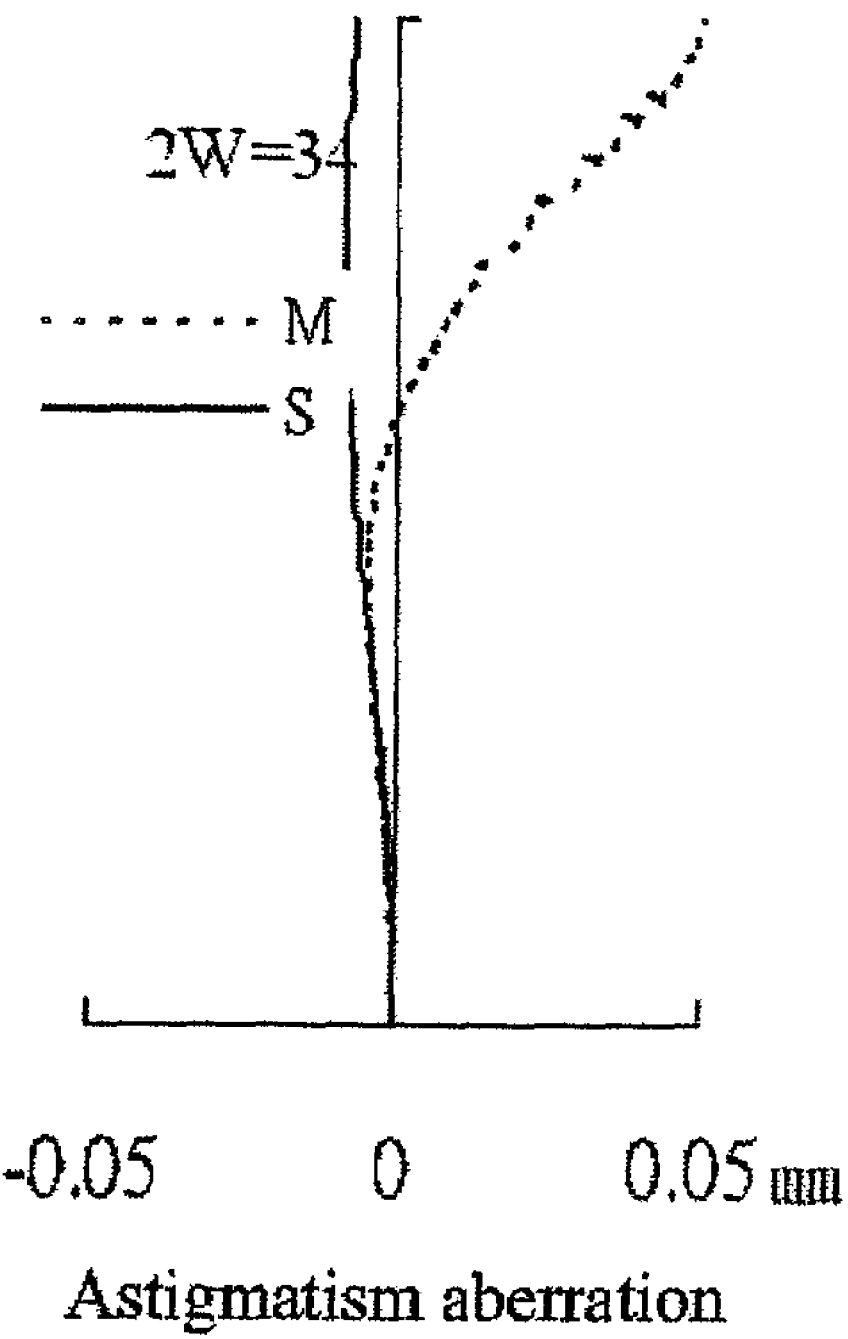
Figure 2C:
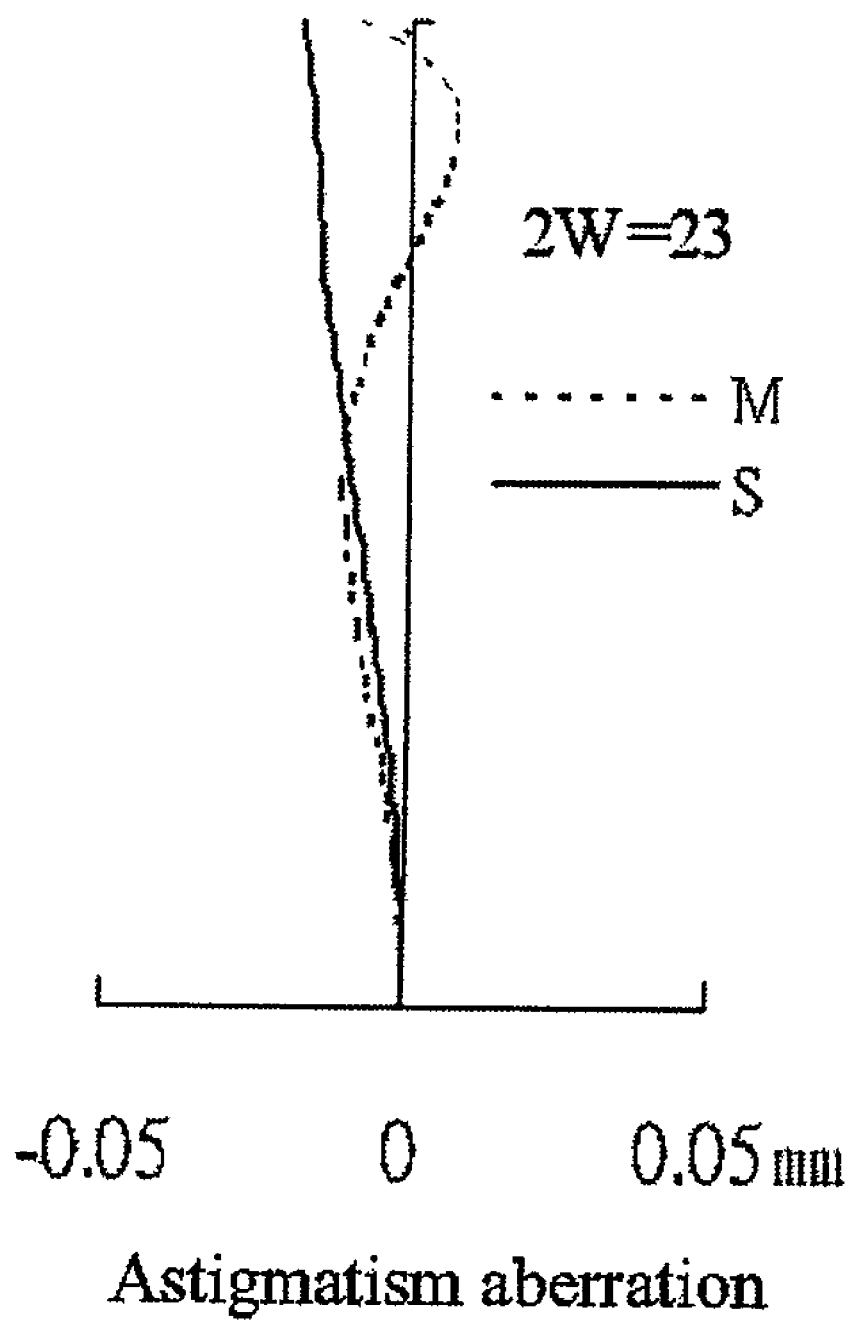

FIGS. 2A-2C are graphical representations of astigmatism aberrations of the zoom lens system corresponding to respective incident angles of 60, 34, and 23 degrees according to the present invention. By FIGS. 2A-2C, the astigmatism aberration of the zoom lens system which is operated between the wide angle state and the telephoto state is always within 0.05 mm.

Figure 3A:
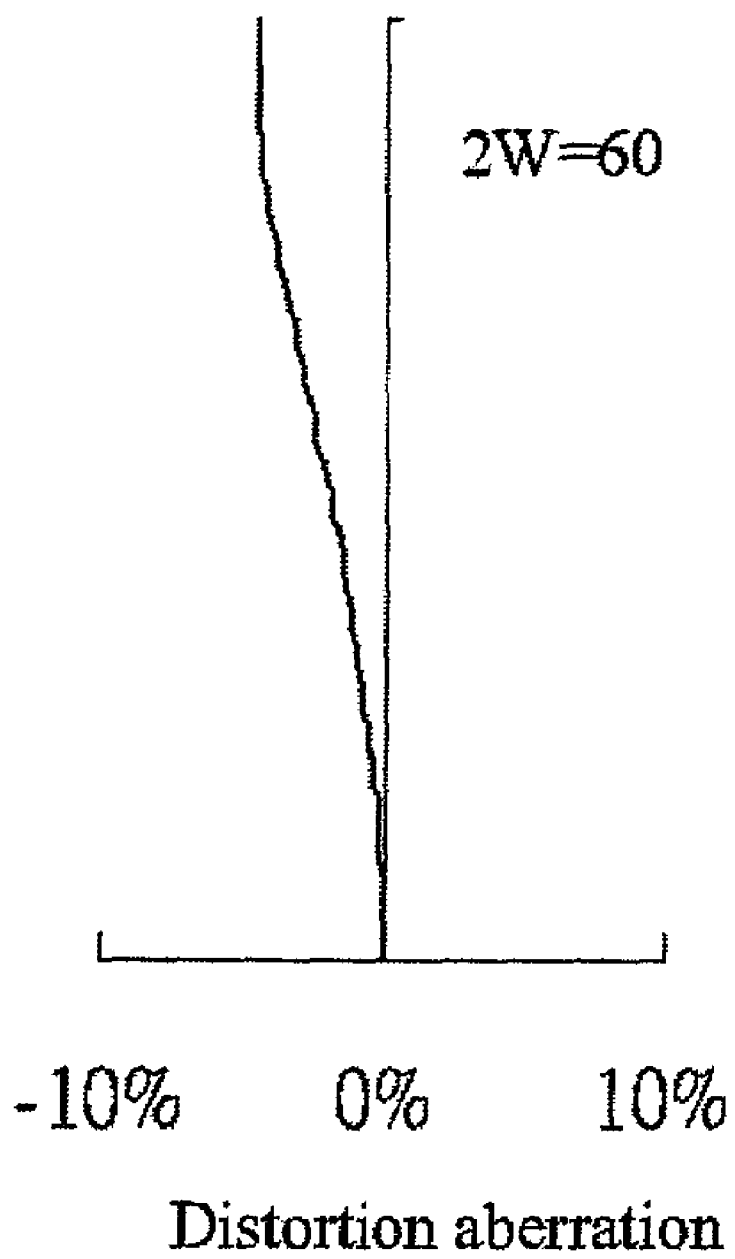
FIGS. 3A-3C are graphical representations of various distortion aberrations of the zoom lens system corresponding to respective incident angles of 60, 34, and 23 degrees according to the present invention.
Figure 3B:
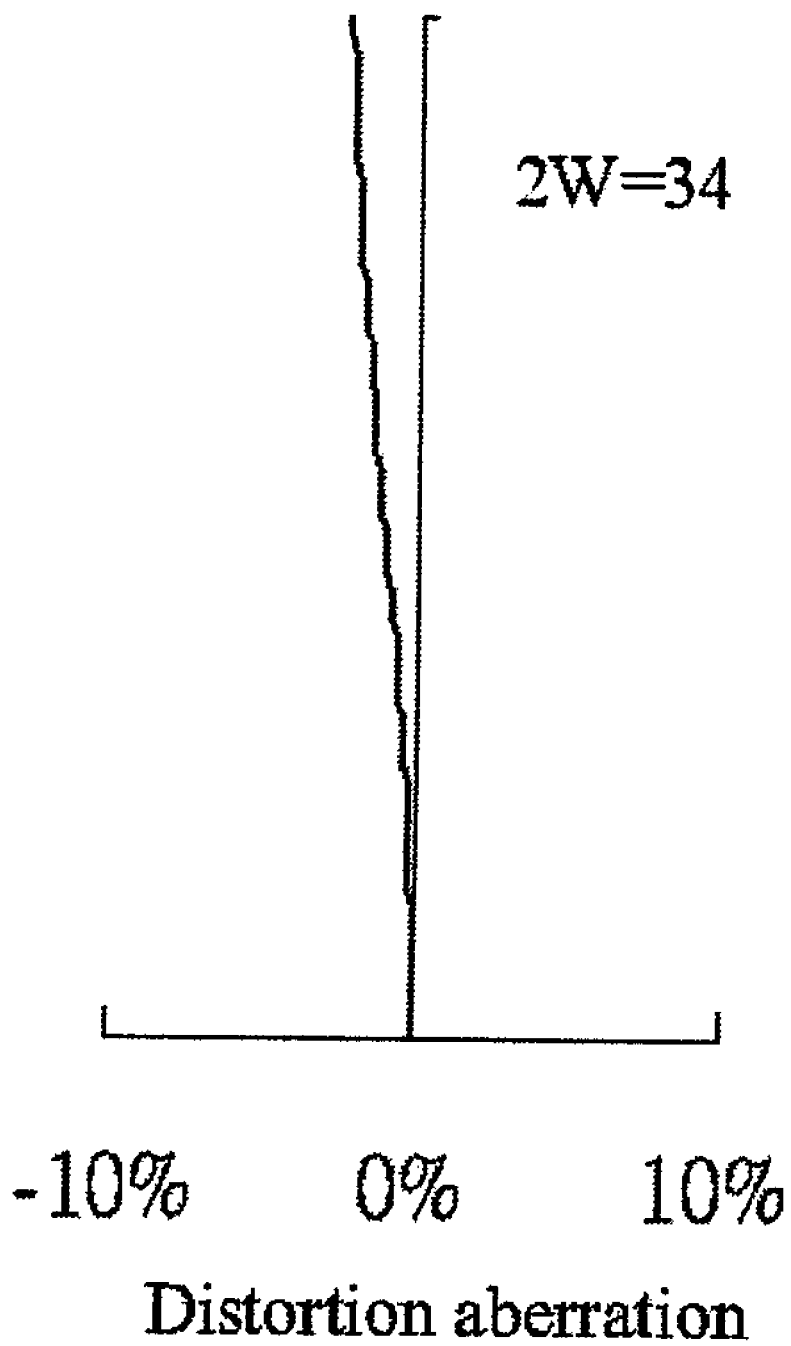
Figure 3C:
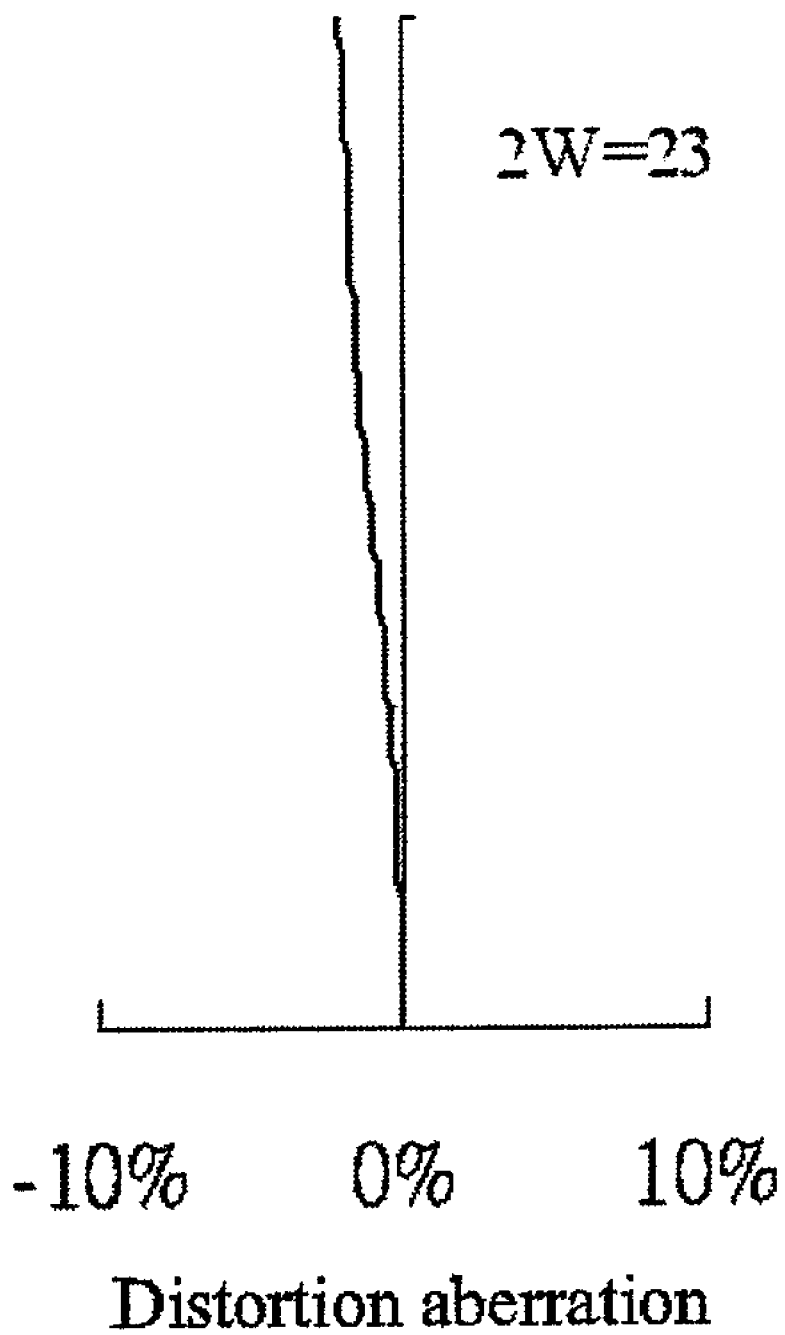

FIGS. 3A-3C are graphical representations of distortion aberrations of the zoom lens system corresponding to respective incident angles of 60, 34, and 23 degrees according to the present invention. From FIGS. 3A-3C, the distortion aberration of the zoom lens system which is operated between the wide angle state and the telephoto state is always within 5%.

Figure 4A:
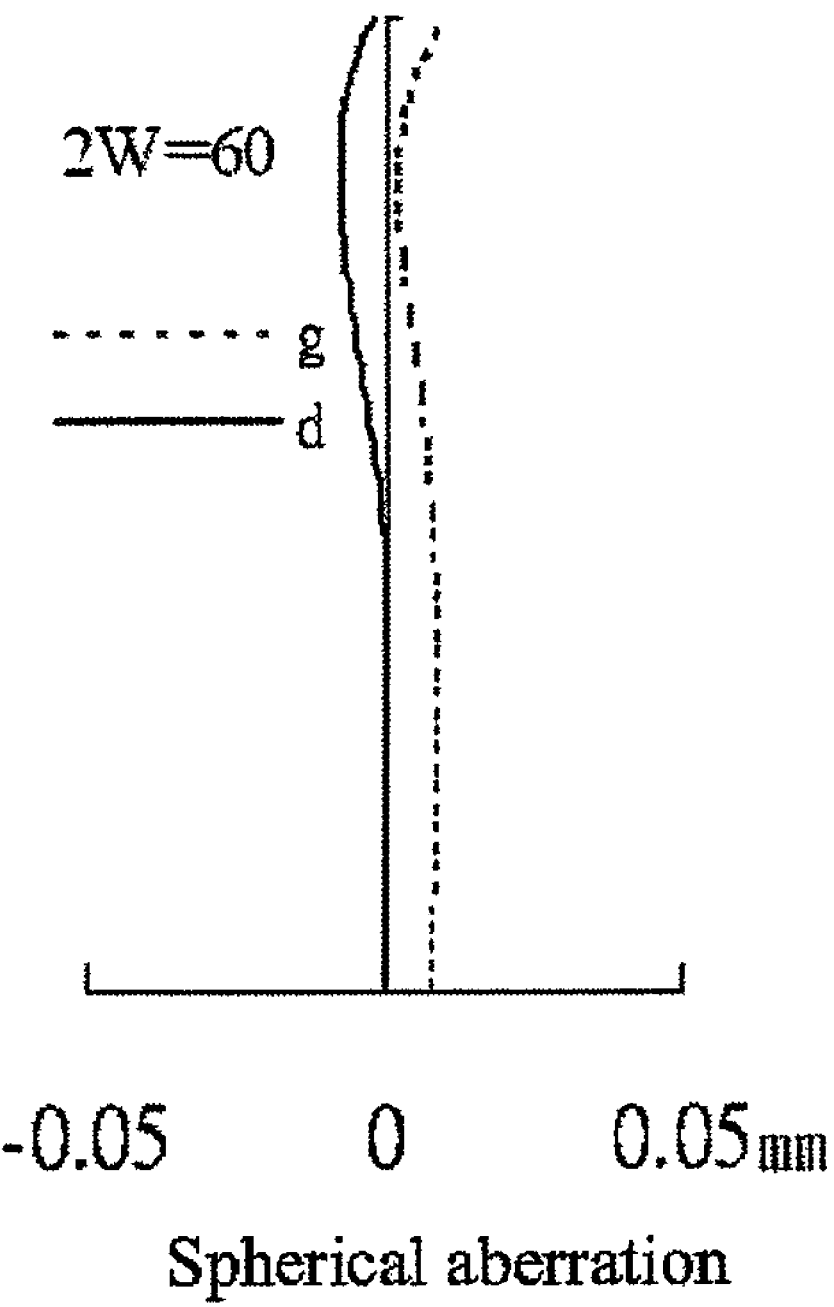
FIGS. 4A-4C are graphical representations of various spherical aberrations of the zoom lens system corresponding to respective incident angles of 60, 34, and 23 degrees according to the present invention.
Figure 4B:
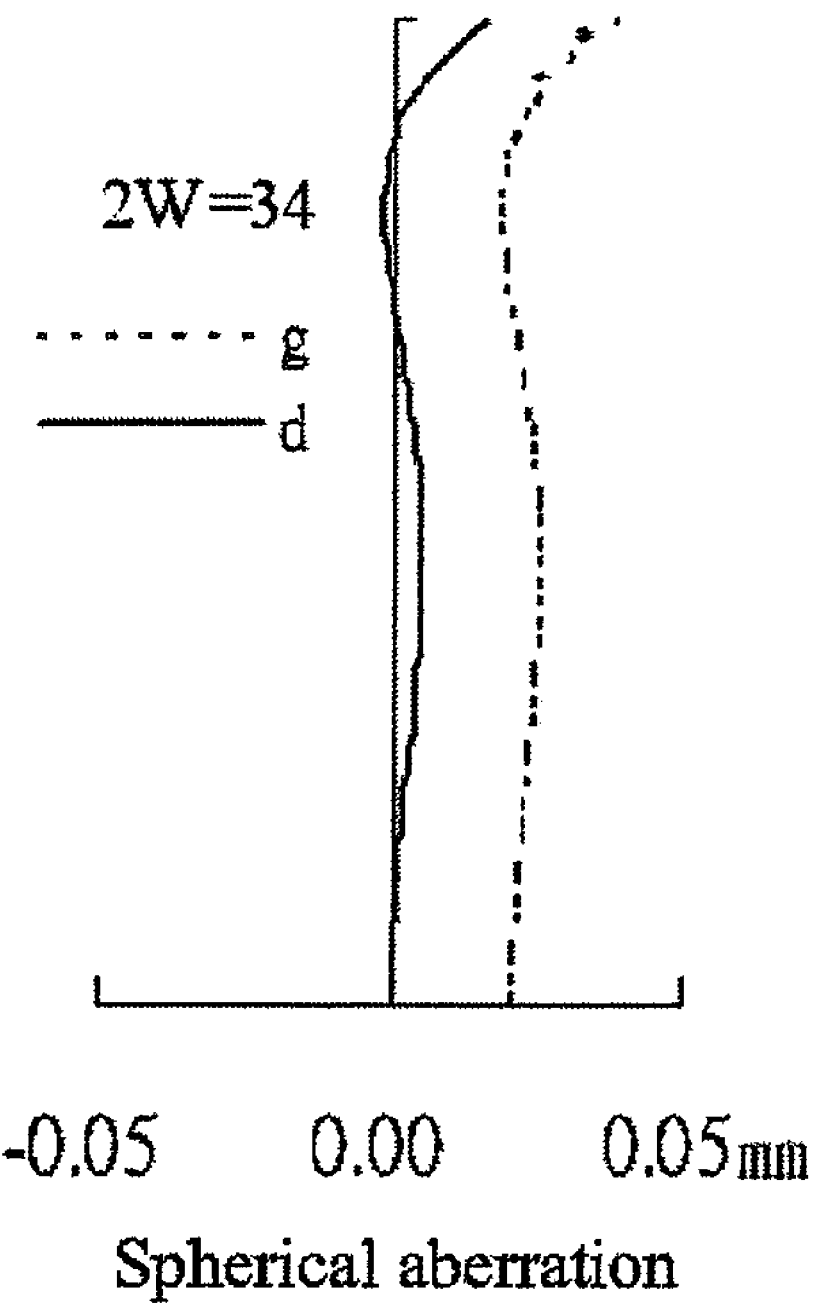
Figure 4C:
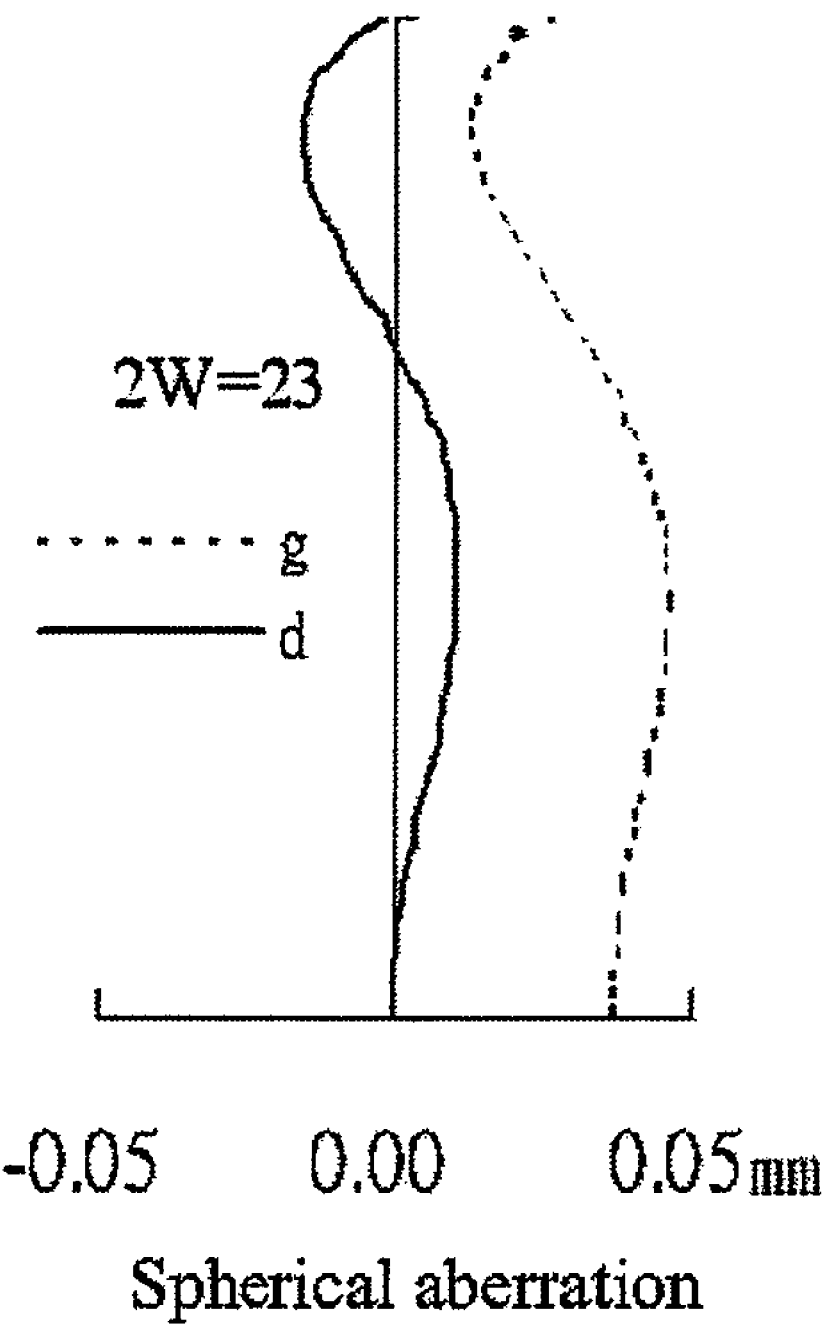

FIGS. 4A-4C are graphical representations of spherical aberrations of the zoom lens system corresponding to respective incident angles of 60, 34, and 23 degrees according to the present invention. From FIGS. 4A-4C, the spherical aberration of the zoom lens system which is operated between the wide angle state and the telephoto state is always within 0.05 mm.

Figure 5A:
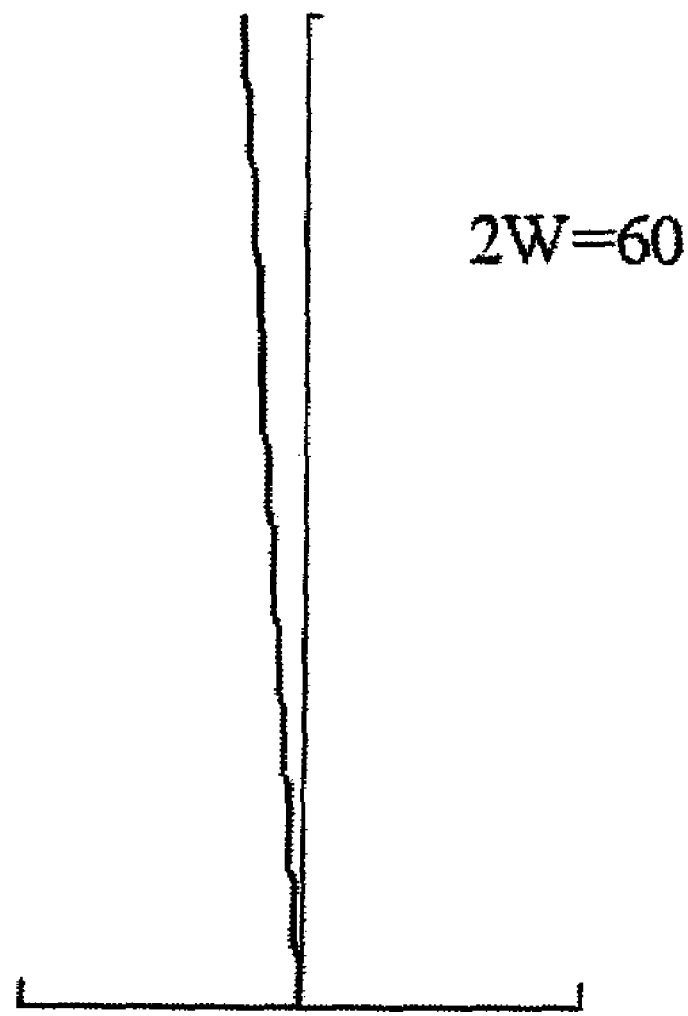
FIGS. 5A-5C are graphical representations of various lateral chromatic aberrations of the zoom lens system corresponding to respective incident angles of 60, 34, and 23 degrees according to the present invention.
Figure 5B:
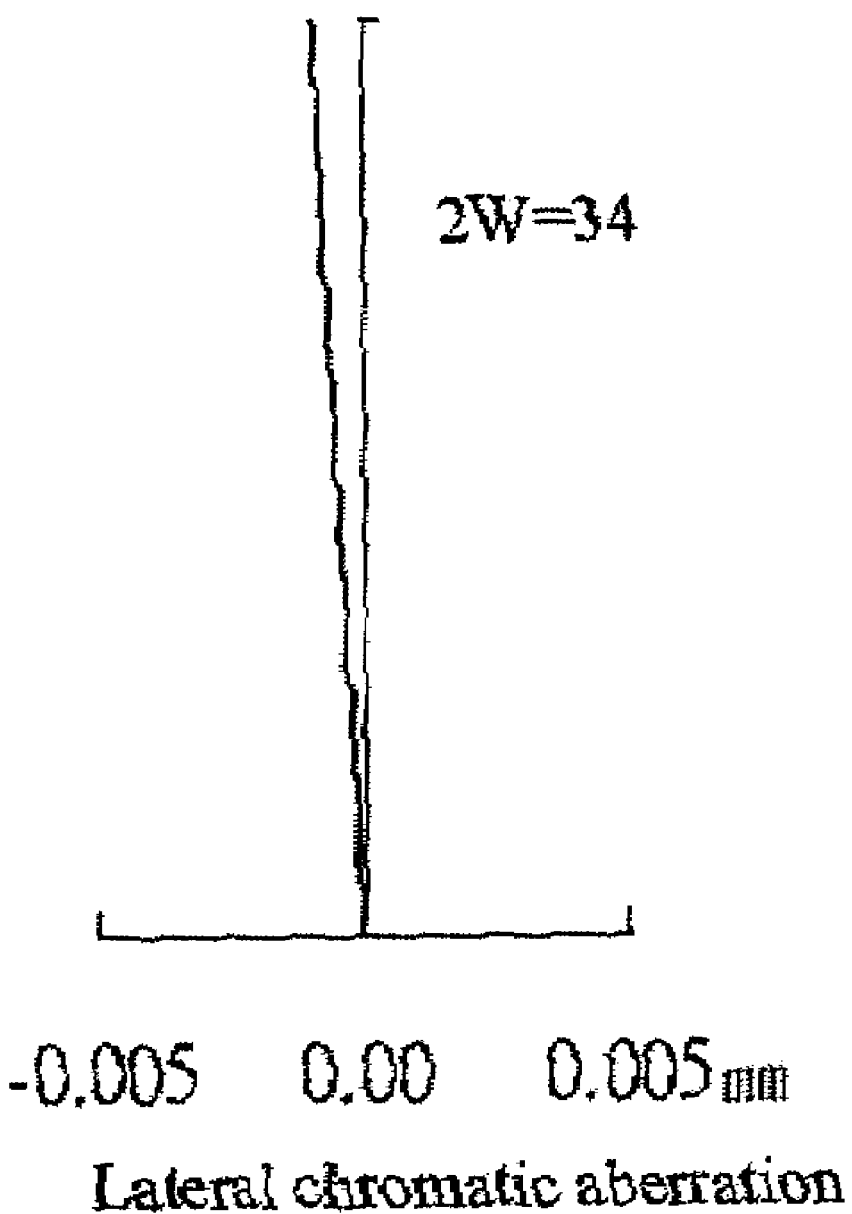
Figure 5C:
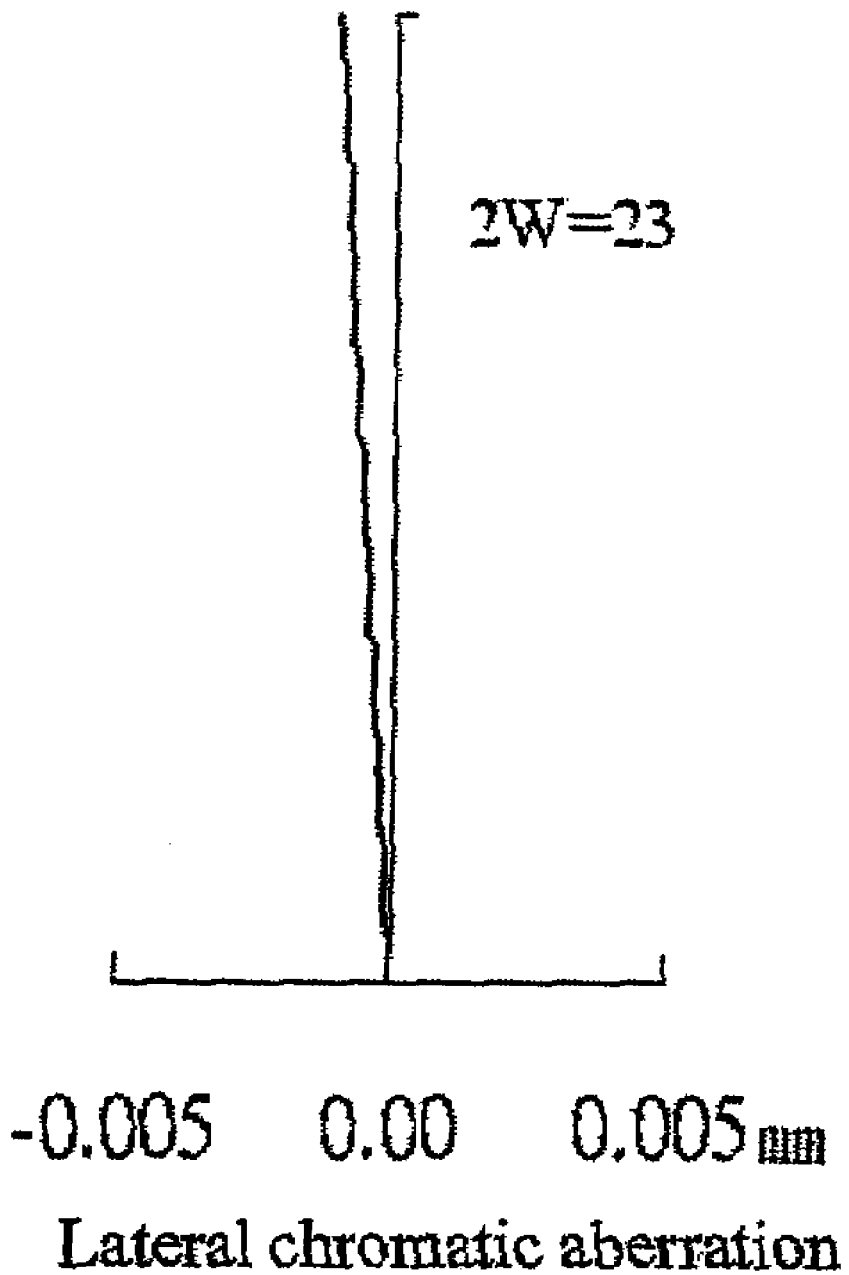

FIGS. 5A-5C are graphical representations of lateral chromatic aberrations of the zoom lens system corresponding to respective incident angles of 60, 34, and 23 degrees according to the present invention. From FIGS. 5A-5C, the lateral chromatic aberration of the zoom lens system which is operated between the wide angle state and the telephoto state is always within 0.005 μm.

Figure 6A:
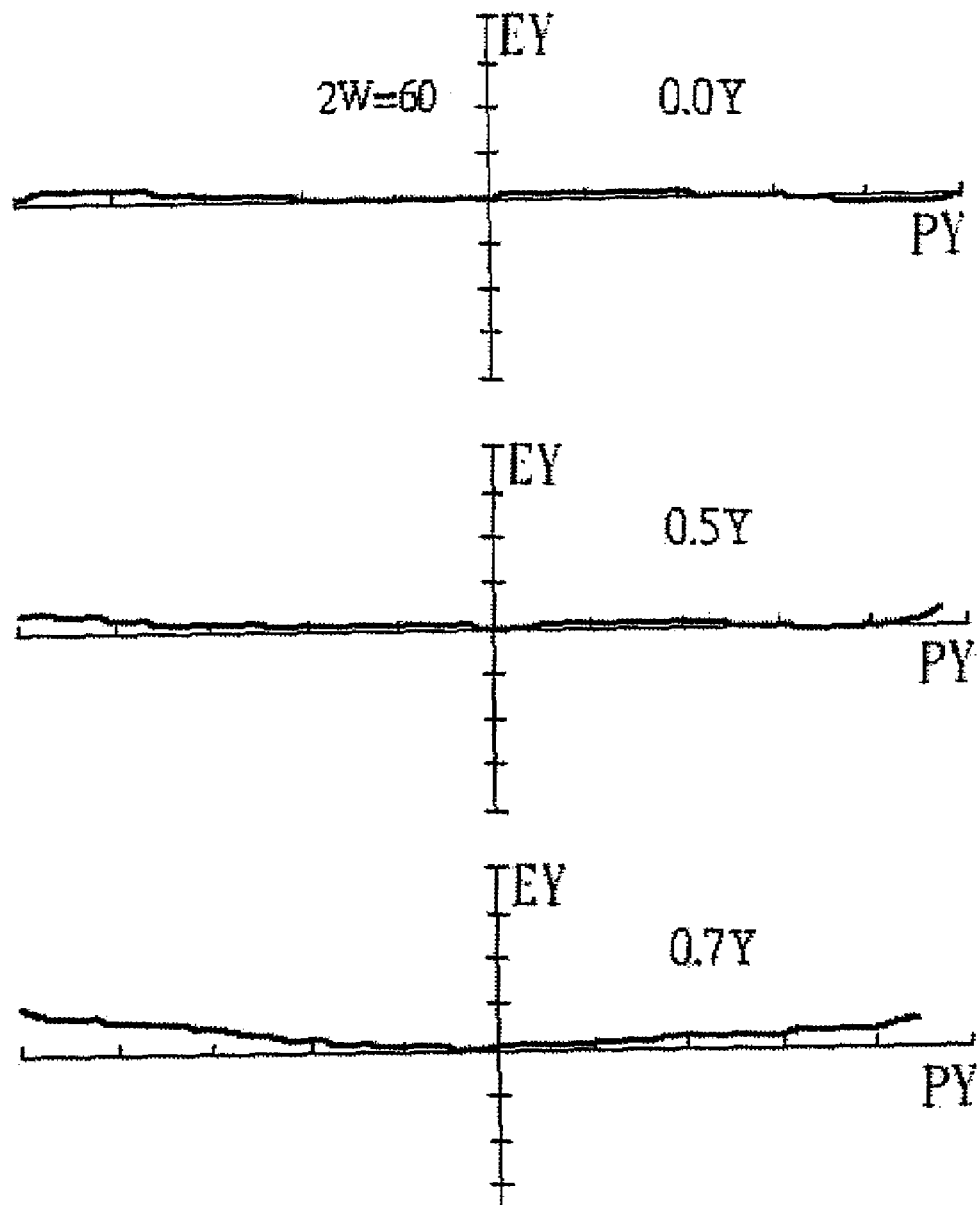
FIGS. 6A-6C are graphical representations of ray aberrations of the zoom lens system corresponding to respective incident angles of 60, 34, and 23 degrees and respective incident image heights of 0Y, 0.5Y, and 0.7Y according to the present invention.
Figure 6B:
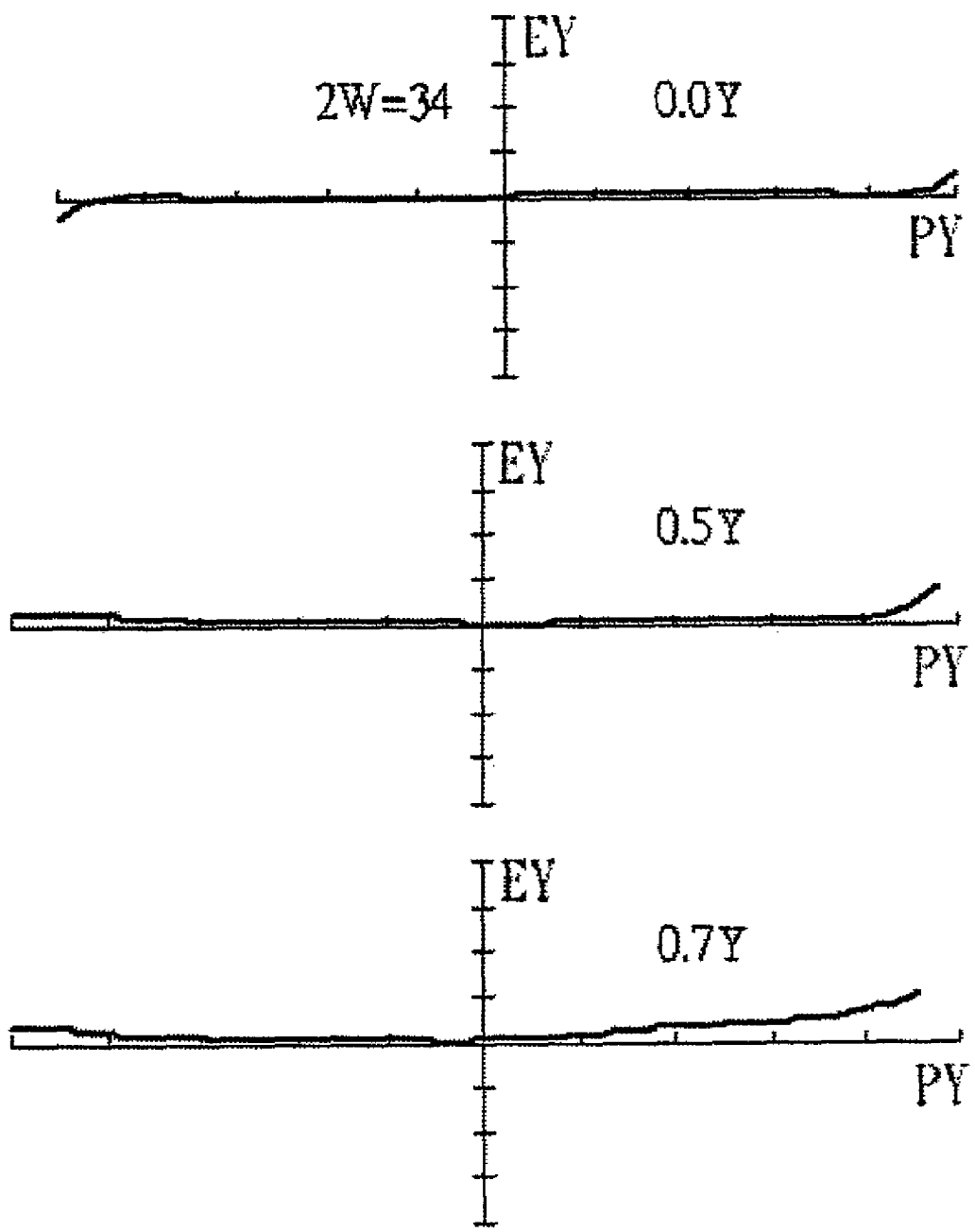
Figure 6C:
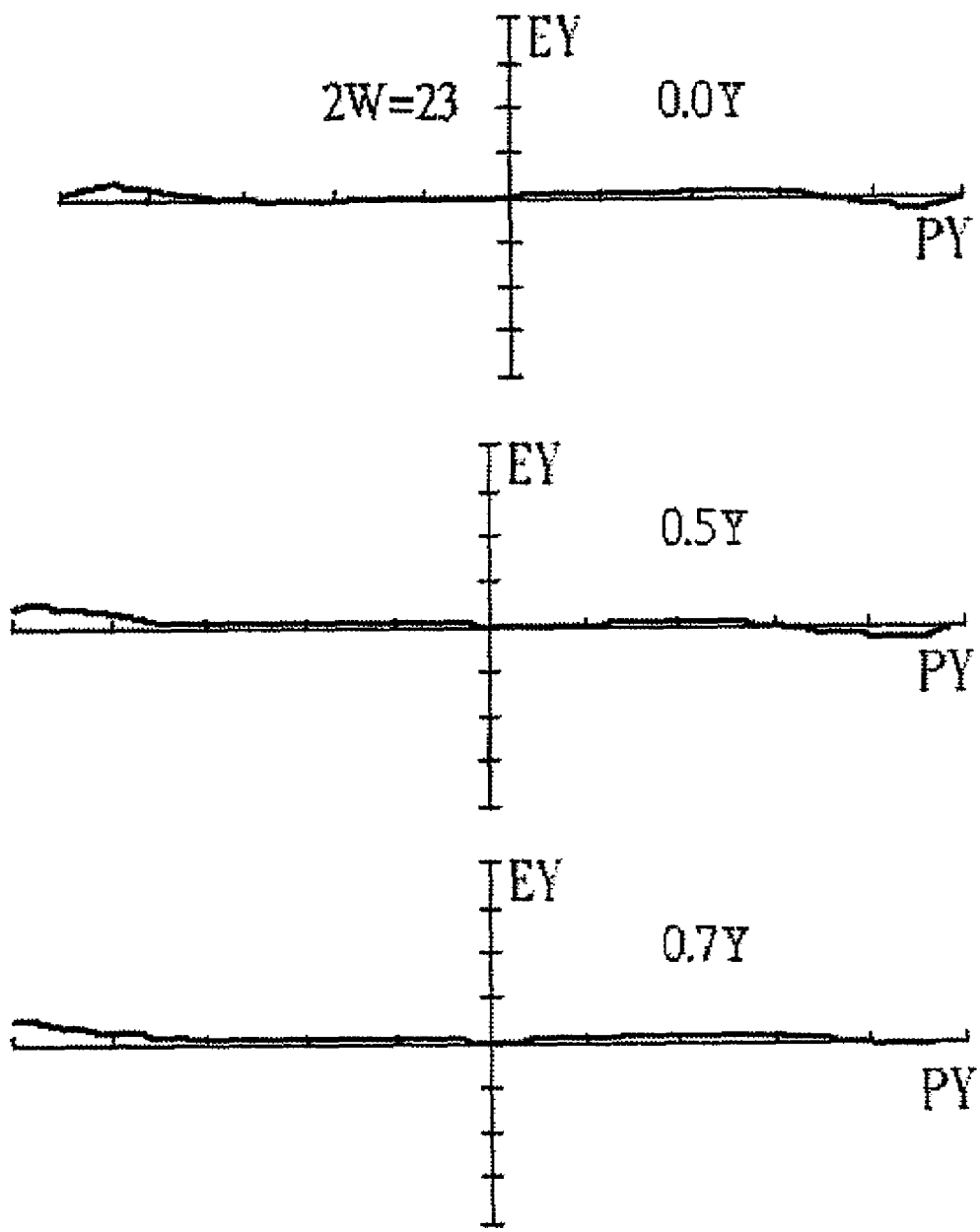

FIGS. 6A-6C are graphical representations of ray aberrations of the zoom lens system corresponding to respective incident angles of 60, 34, and 23 degrees and respective incident image heights of 0Y, 0.5Y and 0.7Y according to the present invention. From FIGS. 6A-6C, the ray aberrations of the zoom lens system which is operated between the wide angle state and the telephoto state are very smooth.

Consequently, the zoom lens system of the preferred embodiment provides a better image quality.

Referring to FIG. 1 and Table.1, the grating STO of the zoom lens system is disposed between the first lens group G1 and the second lens group G2, and is combined with the second lens group G2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A zoom lens system in sequence arranging from an object side toward an image side comprising:
   a first lens group with a negative optical power, comprising in sequence from an object side to an image side, a first negative lens, a first positive lens, and a second negative lens made of plastic;
   a second lens group with a positive optical power comprising, in sequence from an object side to an image side, a second positive lens, a third negative lens adhered to the second positive lens, and a third meniscus positive lens; and a third lens group with a positive optical power, comprising a fourth positive lens;
wherein the zoom lens system meets a criteria of $$0.08 < \left|\frac{R1}{R2}\right| < 0.52,$$

where R1 indicates a curvature radius facing the object side of a first surface of the second negative lens; and R2 indicates a curvature radius facing the image side of a second surface of the second negative lens.

2. The zoom lens system of claim 1 further complying with $$0.14 < \frac{fG1 \times fG3}{fL3 \times fL6} < 0.31$$

where fG1 indicates a focus length of the first lens group, fG3 indicates a focus length of the third lens group, fL3 indicates a focus length of the second negative lens, and fL6 indicates a focus length of the third positive lens.

3. The zoom lens system of claim 1 further complying with $$1.85 < \frac{fW \times LW}{fT \times Y} < 2.21$$

where fW indicates a focus length of the zoom lens system when the zoom lens system operates in a wide angle state, LW indicates a length of the zoom lens system when the zoom lens system operates in the wide angle state, fT indicates a focus length of the zoom lens system when the zoom lens system operates in a telephoto state, and Y indicates a maximum height of an image formed at the image side.

4. The zoom lens system of claim 2 further complying with $$1.85 < \frac{fW \times LW}{fT \times Y} < 2.21$$

where fW indicates a focus length of the zoom lens system when the zoom lens system operates in a wide angle state, LW indicates a length of the zoom lens system when the zoom lens system operates in the wide angle state, fT indicates a focus length of the zoom lens system when the zoom lens system operates in a telephoto state, and Y indicates a maximum height of an image formed at the image side.

5. The zoom lens system of claim 1, wherein the second negative lens comprises at least an aspherical surface.

6. The zoom lens system of claim 5, wherein the third positive lens comprises at least an aspherical surface, and is made of plastic.

7. The zoom lens system of claim 6, wherein the fourth positive lens comprises an aspherical surface facing the object side, and is made of plastic.

8. The zoom lens system of claim 7, wherein the first positive lens is made of plastic.

9. The zoom lens system of claim 8 further comprising a grating disposed between the first lens group and the second lens group.

* * * * *